United States Patent

[11] 3,616,250

| [72] | Inventors | George R. Hrubant;<br>Robert A. Rhodes, both of Peoria, Ill. |
|---|---|---|
| [21] | Appl. No. | 769,701 |
| [22] | Filed | Oct. 22, 1968 |
| [45] | Patented | Oct. 26, 1971 |
| [73] | Assignee | The United States of America as represented by the Secretary of Agriculture |

[54] PREFERENTIAL ENZYMATIC LYSIS OF VEGETATIVE CELLS IN PRESENCE OF SPORULATED BACTERIAL CELLS
1 Claim, No Drawings

[52] U.S. Cl.......................................................... 195/96, 195/66
[51] Int. Cl........................................................ C12d 13/10
[50] Field of Search............................................ 195/96, 66

[56] References Cited
OTHER REFERENCES
Greenberg et al., J. of Bacteriology, Vol. 69, page 45, 1955

*Primary Examiner*—A. Louis Monacell
*Assistant Examiner*—Seymour Rand
*Attorneys*—R. Hoffman and W. Bier ABSTRACT: A novel extracellular enzyme complex precipitated from cultures of Bacillus NRRL B-3425 at critical concentrations selectively destroys the vegetative but not the sporulated cells of *Bacillus popilliae* or other spore-forming bacteria, thus providing a means for isolating laboratory-grown *B. popilliae* spores required for studying the apparently limited infectivity of the spores produced in vitro as compared with spores from diseased Japanese beetle larvae.

3,616,250

PREFERENTIAL ENZYMATIC LYSIS OF VEGETATIVE CELLS IN PRESENCE OF SPORULATED BACTERIAL CELLS

FIELD OF THE INVENTION

This invention relates to the discovery of an enzymatic means for selectively lysing vegetative bacterial cells but not the corresponding spores, thus permitting isolation and study of the latter, if desired.

More particularly, this invention relates to the discovery that critical concentrations of the novel extracellular enzyme complex precipitated from cultures of the microorganism Bacillus NRRL B–3425 comprises electrophoretically distinguishable components that selectively lyse the vegetative but not the sporulated bacterial cells present together in a culture.

Still more particularly, this invention relates to a process wherein laboratory cultures of Japanese beetle milky disease bacilli are incubated with the novel enzyme produced by Bacillus NRRL B–3425 whereby only the vegetative bacterial cells are lysed, thus permitting recovery of viable Japanese beetle disease spores essentially free or completely free of cells in the vegetative form especially for basic research on the evocation of Japanese beetle milky disease and for the selective cytological study of the sporogenesis of *B. popilliae* and of spore formers in general. In addition, our novel enzyme may be useful in determining the chemical composition and structure of the cell wall.

DESCRIPTION OF THE PRIOR ART

*Bacillus popilliae* is the principal natural pathogen of Japanese beetle milky disease. Control of the offensive and destructive pest by biological means is limited by the difficulty of collecting large numbers of diseased larvae for conversion to infective powders. Attempts to induce the disease in laboratory-bred larvae by injecting $10^5$ to $10^6$ *B. popilliae* spores per larva required to obtain more than 50 percent infectivity have been of limited value since a concommitant presence of a like number of vegetative cells per se quickly kills a high proportion of the larvae without permitting development of the disease that is characterized by a terminal spore count of about $10^{10}$ spores per milliliter of hemolymph.

Furthermore, widespread research directed toward the development of media that would improve the low percentages of *B. popilliae* spores produced in laboratory cultures of the organism has not significantly improved the spore percentage, and basic research on the spores, presently incompletely separated form the vegetative cells by differential flotation in a two-phase medium or density gradient centrifugation, continues at a number of institutions.

Broadly, the object of the present invention is the provision of an enzymatic process for selectively lysing only the noncommitted, vegetative cells in a susceptible bacterial preparation containing both vegetative and sporulated or sporulation-committed bacterial cells.

A more specific object is the provision of an enzymatic process for selectively lysing the vegetative cells but not the spores or spore-committed cells in an in vitro fermentation of *B. popilliae*, whereby to obtain viable sporangial cells essentially free of the corresponding vegetative cells, and thereby providing fermentation-derived infective spores that can be pooled if necessary and the vegetative-free millions then safely injected into healthy Japanese beetle larvae to produce the disease and to develop meaningful infectivity data.

Other objects and advantages of the invention will appear hereinafter.

In accordance with the above-stated objects we have now discovered that incubation for about 90 min. at 37°–50° C. of dilute suspensions of the extracellular enzyme elaborated in a conventional semisynthetic medium by Bacillus NRRL B–3425 and precipitated therefrom either by acetone or by $(NH_4)_2SO_4$, with mixed vegetative and sporulated cell preparations of a large diversity of spore-forming bacterial species including members of Bacillus, Clostridium, and Sarcina, and especially of the various strains of Japanese beetle milky disease bacteria, i.e., *B. popilliae*, selectively lyses the vegetative cells therein without lowering the sporulated cell population or the viability of the latter, thereby enabling the recovery by centrifugation of a cell population constituted essentially exclusively of living sporulated cells.

SUMMARY OF THE INVENTION

The extracellular enzyme complex produced by Bacillus NRRL B–3425 lyses a wide spectrum of bacterial cells that are in the vegetative form without also lysing the sporulated or spore-committed cells. This highly selective action is of particular value in ridding a highly mixed vegetative cell/sporulated cell population of Japanese beetle milky disease cells of its purely vegetative cells so that exclusively the sporulated portion of the population in viable form survives and is available for infectivity studies as well as studies or related basic mechanisms.

Thus, the principal object of the invention, namely an enzymatic means for selectively lysing the vegetative cells but not the sporulated *B. popilliae* cells provides a more homogenously sporulated cell population than the prior separations using liquids with slightly different densities, and also induces several percent of vegetative cells not apparently already spore-committed to form spheroplasts.

DESCRIPTION OF PREFERRED EMBODIMENTS

Example 1

Crude Bacillus NRRL B–3425 enzyme was prepared by inoculating 100-ml. aliquots of sterilized aqueous medium containing 0.5 percent commercially available yeast extract (Difco), 0.15 percent $K_2HPO_4$, and 0.01 percent thiamin HCl with 0.1 ml. of a 4–5 day virtually entirely sporulated suspension of Bacillus NRRL B–3425, and incubating the inoculated flasks for 12–14 hours at 28° C. on a rotary shaker. After removal of the cells by centrifugation at 4° C., the crude enzyme was obtained by precipitation from the supernatant with two volumes of acetone after discarding the precipitate obtained with a preceding single volume of acetone. The second precipitate was isolated by centrifugation and then resuspended in 2 ml. (One-fiftieth original crude enzyme volumn) of 0.02 M $Na_2HPO_4$ —$KH_2PO_4$ buffer (pH6.8). After flushing air over the buffered enzyme suspension to remove residual acetone, the suspension was dialyzed for 24 hours against three changes of said buffer, dialysis against water having been found to destroy the lytic activity while dialysis against physiological NaCl, KCl, or $Na_2SO_4$ considerably lowered the activity. Equivalent precipitation of the enzyme from the cell-free filtrate was obtained with 40 g. $(NH_4)_2SO_4$ /100 ml. and is the preferred procedure for isolation from large volumes of culture filtrates.

For assay, the concentrated dialyzed enzyme was diluted with phosphate buffer to a protein value of 20–25 µg./ml., which final value corresponds to one to two times the protein concentration of the unpurified crude enzyme material.

Electrophoresis of the enzyme showed it to be a complex comprising three protein components, one of which had precisely the same mobility as commercially obtained bacterial protease Type VII. Proteolytic activity of two of the three isolated protein components was detected with both litmus milk and gelatin.

Two ml. of a 16 culture of *B. popilliae* and 1 ml. of the standardized enzyme solution were combined in a 13×100 mm. test tube, the tube was inverted once and the optical density read at 540 mµ. The tube was then incubated in a 50° C. water bath, and lysis of the cells was plotted by OD readings at 5-min. intervals during a total of 90 min., nearly quantitative vegetative cell lysis being reached by 30 min. and total vegetative cell lysis being reached by 60 min. The ratio of cells to enzyme was found to markedly influence the extent of cell lysis, an enzyme concentration of 5–10 µg./ml. being optimal when the cell population corresponded to an OD of 0.3–0.5 at 540

$m\mu$. Lysis was inhibited when the enzyme concentration exceeded 25 $\mu$g./ml., and only about 20 percent of the optimal lysis occurred when 50 $\mu$ g./ml. was used.

The lytic activity of the enzyme was doubled when the incubation temperature was raised from 28° to 37° C. and doubled again at 50° C.

Identical treatment of spores from pooled hemolymph aspirated from infected *Popillia japonicum* larvae and expectedly containing only sporulated cells showed no loss of OD.

Example 2

Colonies of a 39-day sporulating culture of *B. popilliae* NRRL B–2309m were suspended in phosphate buffer and a 2 - ml. portion of the mixed spore-vegetative cell suspension was incubated with 1 ml. of the enzyme preparation of example 1. The resulting decrease in OD showed that about half of the cells were lysed. Microscopic examination revealed that not only the spores but also the prespores and other cells presumably in the sporulation cycle were unaffected by the enzyme.

Example 3

The enzyme susceptibility of vegetative cells as a function of age and remoteness from sporulation was examined with a series (5 to 8 hours) of withdrawals of cells from an actively growing culture of *B. cereus* T NRRL B–2981 compared with cells from a fully sporulated 72-hour culture. The extent of lysis decreased as the culture approached commitment to sporulation and as the proportion of spores increased. A 72-hour fully sporulated control showed no loss of OD.

Example 4

Cultures of 23 different spore-forming bacteria were subjected to lysis in the foregoing manner. Vegetative but not the spore or prespore forms of all of the strains including *B. alvei* NRRL B–384, *B. brevis* NRRL B–1874, *B. cereus* NRRL B–569, *B. coagulans* NRRL B–768, *B. larvae* NRRL B–2610, *B laterosporus* NRRL–NRS–314, *B. lentimorbus* NRRL B–2530, *B. megatarium* NRRL B–938, *B. polymyxa* NRRL B–694, *B. popilliae* NRRL B–2309S, *B.popilliae* NRRL B–2309, *B*, *popilliae* NRRl –2309L, *B. popilliae* NRRL B–2525, *B. popilliae* NRRL B–3328A, *B. popilliae* NRRL B–3329C, and *B. subtilis* NRRL B–543 *B. thuringiensis* NRRL B–2172 B–3425 enzyme.

Thirty species of nonspore-forming bacteria were also tested with the enzyme. Of the gram positive species, only Staphlococcus spp. were lysed.

We claim:

1. A process for obtaining essentially only sporulated bacterial cells by very selectively lysing only the uncommitted vegetative cells but not the sporulated or spore-committed cells present in a sporulated bacterial specimen obtained from a culture of a spore-forming bacterial organism selected from the group consisting of *Bacillus popiliae, B. cereus, B. lentimorbus, B. megaterium, B. polymyxa, B. substilis, and B. thuringiensis*, said process comprising incubating for 60—90 min. at about 50° C., 2 ml. of said specimen having a combined vegetative cell-sporulated cell population corresponding to an optical density value of 0.3–0.5 at 540 $m\mu$ with 1 ml. of phosphate buffer solution containing about 10 $\mu$ g. of the phosphate buffer-dialyzed extracellular enzyme precipitated from the cell-free supernatant of a shake-flask fermentation of Bacillus NRRL B–3425, and centrifuging to recover the sporulated cells essentially free of cells in the vegetative form.

* * * * *